(12) United States Patent
Soppera et al.

(10) Patent No.: US 8,660,914 B2
(45) Date of Patent: Feb. 25, 2014

(54) CONTROL OF SUPPLY NETWORKS AND VERIFICATION OF ITEMS

(75) Inventors: Andrea Soppera, Ipswich (GB); Trevor Burbridge, Ipswich (GB)

(73) Assignee: British Telecommunications PLC, London (GB)

( * ) Notice: Subject to any disclaimer, the term of this patent is extended or adjusted under 35 U.S.C. 154(b) by 154 days.

(21) Appl. No.: 13/063,074

(22) PCT Filed: Sep. 9, 2009

(86) PCT No.: PCT/GB2009/002160
§ 371 (c)(1),
(2), (4) Date: Mar. 9, 2011

(87) PCT Pub. No.: WO2010/029294
PCT Pub. Date: Mar. 18, 2010

(65) Prior Publication Data
US 2011/0167010 A1   Jul. 7, 2011

(30) Foreign Application Priority Data
Sep. 12, 2008   (EP) .................................... 08253008

(51) Int. Cl.
*G06Q 10/00*   (2012.01)
*G06G 1/14*   (2006.01)
*G06Q 20/00*   (2012.01)

(52) U.S. Cl.
USPC ............................................. 705/28; 705/22

(58) Field of Classification Search
USPC .................................................... 705/22, 28
See application file for complete search history.

(56) References Cited

U.S. PATENT DOCUMENTS

| 5,469,363 | A | 11/1995 | Saliga |
| 7,806,342 | B2 * | 10/2010 | Lapstun et al. ............... 235/494 |
| 2001/0002487 | A1 | 5/2001 | Grawrock et al. |
| 2004/0044863 | A1 | 3/2004 | Trimmer et al. |
| 2005/0262349 | A1 * | 11/2005 | Lapstun et al. ............... 713/176 |
| 2005/0267791 | A1 * | 12/2005 | LaVoie et al. ...................... 705/7 |
| 2006/0106718 | A1 * | 5/2006 | Spellman et al. ............... 705/50 |
| 2006/0206246 | A1 * | 9/2006 | Walker ............................ 701/16 |
| 2006/0250249 | A1 * | 11/2006 | Cheng ........................ 340/572.4 |

(Continued)

FOREIGN PATENT DOCUMENTS

| WO | WO 2006/015617 | | 2/2006 | |
| WO | WO-2006015617 | * | 2/2006 | ................ G07F 7/10 |

OTHER PUBLICATIONS

International Search Report for PCT/GB2009/002160, mailed Dec. 30, 2009.

*Primary Examiner* — Ig T An
(74) *Attorney, Agent, or Firm* — Nixon & Vanderhye PC

(57) ABSTRACT

Methods and systems for use in enabling verification by entities on a path across a supply network of an item identification means traversing said path, the network comprising: at least one supplier entity able to introduce into the network an item identification means having stored therein an item identifier and a digital signature associated with said supplier entity, and to forward said item identification means along a path across said network; at least one intermediate entity able to receive said item identification means from said at least one supplier entity or from another intermediate entity in said network and forward said item identification means along said path; and at least one receiver entity able to receive said item identification means from an intermediate entity in said network.

23 Claims, 6 Drawing Sheets

Example II: combined policy/key store tables

(56) References Cited

U.S. PATENT DOCUMENTS

| | | |
|---|---|---|
| 2007/0156281 A1* | 7/2007 | Leung et al. .................. 700/225 |
| 2007/0192215 A1* | 8/2007 | Taylor et al. ................... 705/28 |
| 2007/0219916 A1* | 9/2007 | Lucas ............................ 705/58 |
| 2007/0273518 A1* | 11/2007 | Lupoli et al. ............... 340/572.1 |
| 2008/0077835 A1 | 3/2008 | Khoche et al. |
| 2008/0175390 A1 | 7/2008 | Alessio et al. |
| 2008/0294536 A1* | 11/2008 | Taylor et al. ................... 705/28 |
| 2008/0301009 A1* | 12/2008 | Plaster et al. .................. 705/28 |
| 2009/0125350 A1* | 5/2009 | Lessing et al. ................... 705/7 |

\* cited by examiner

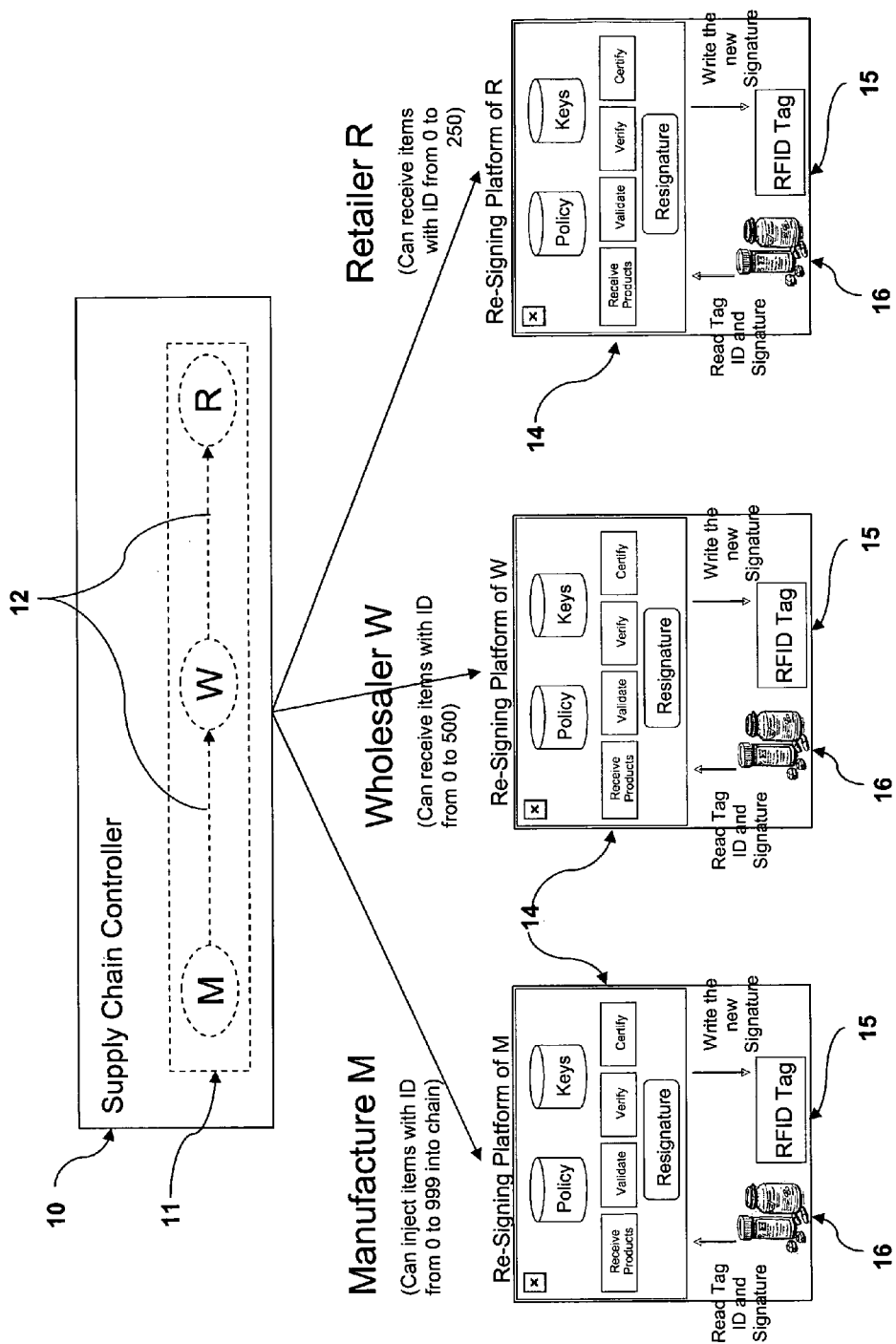
Figure 1 - Secure Physical VPN

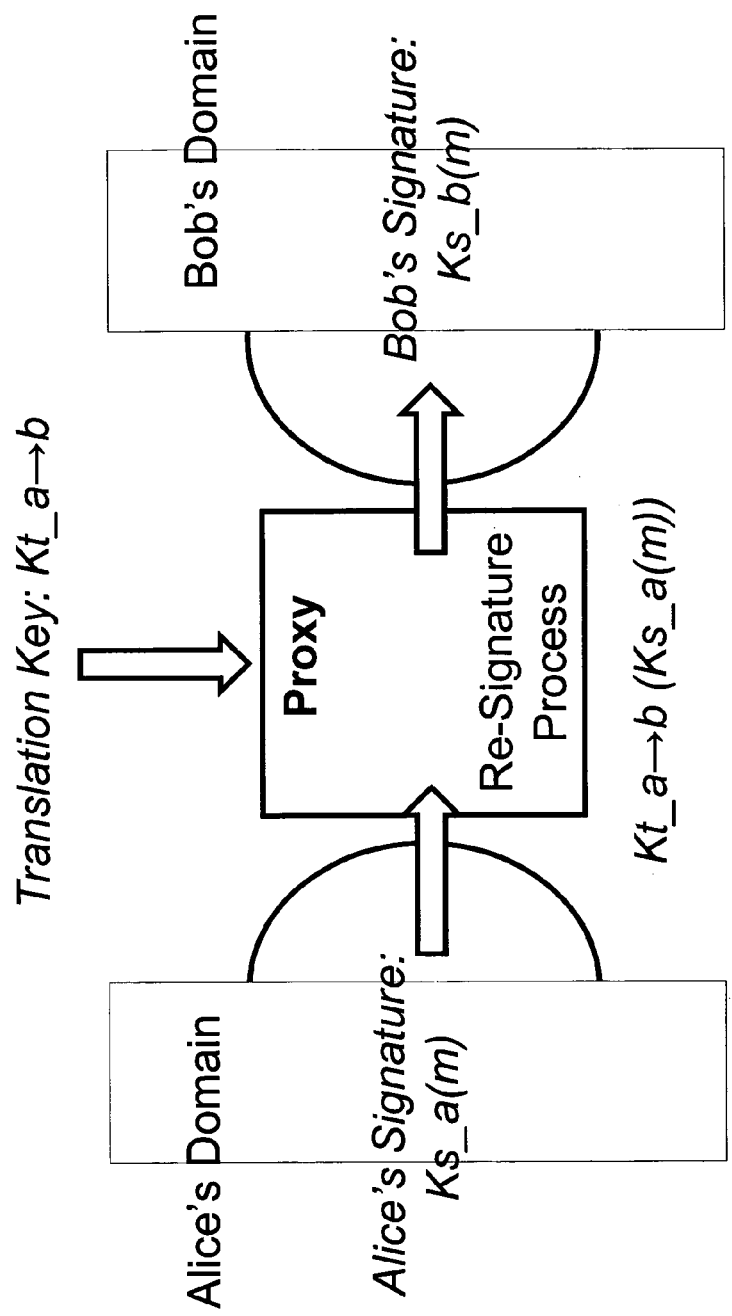
Figure 2 - Proxy re-Signature Scheme

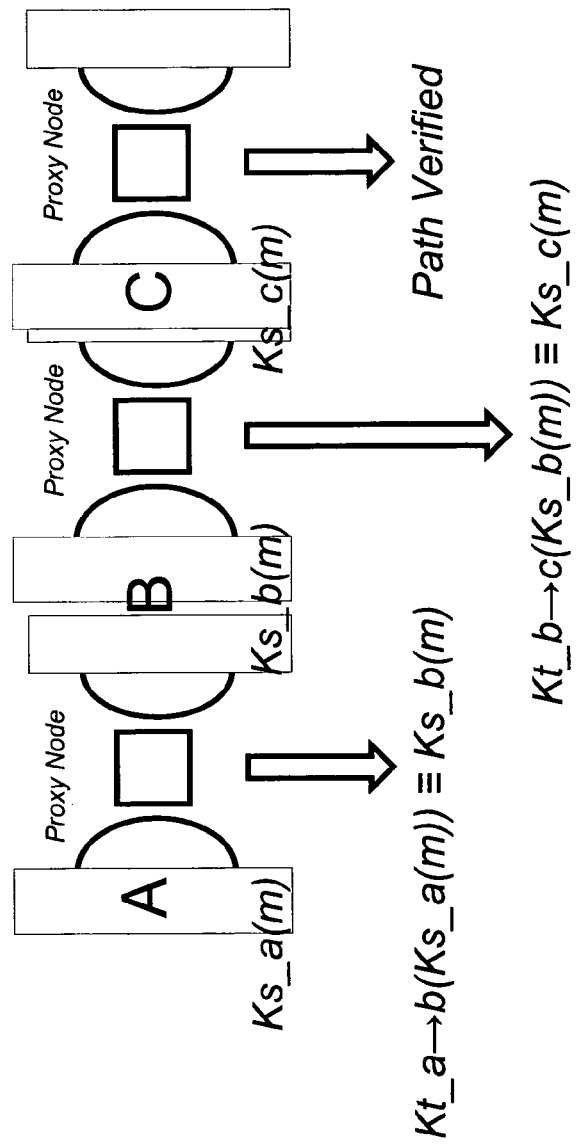
Figure 3 - Verifying a Path Example

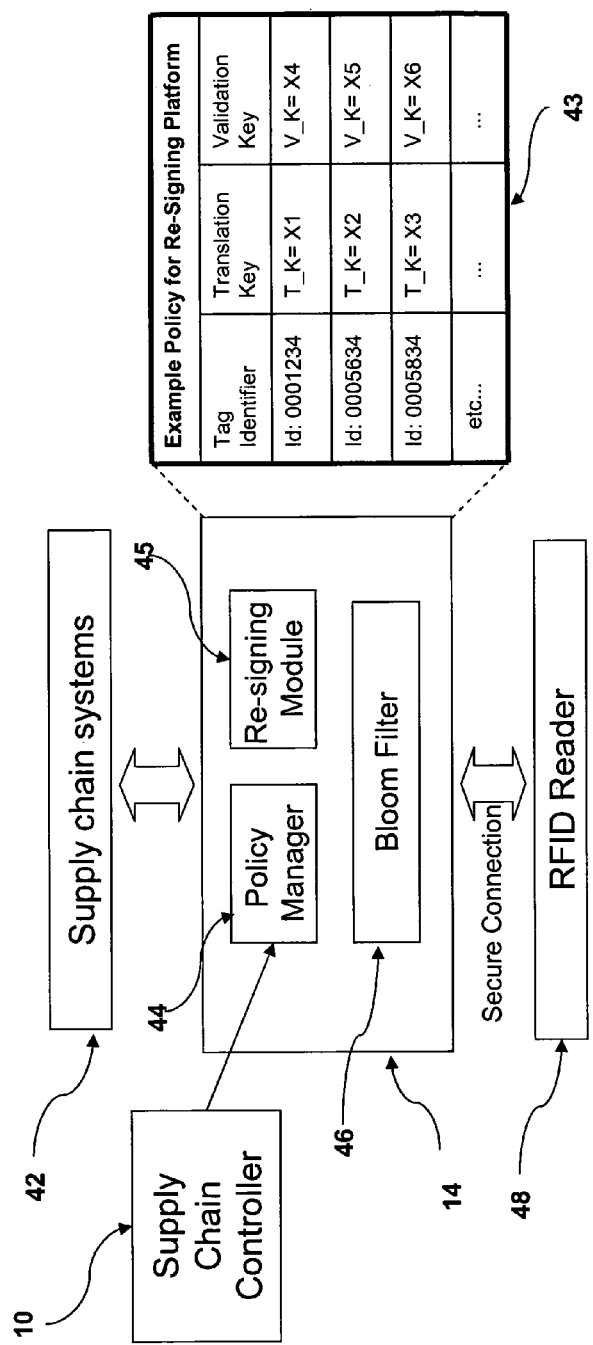
Figure 4 - Re-signing platform architecture
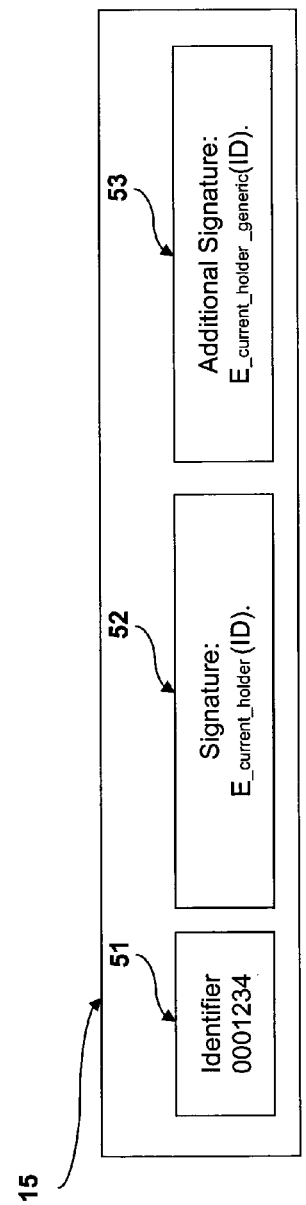
Figure 5 - RFID Tag Memory

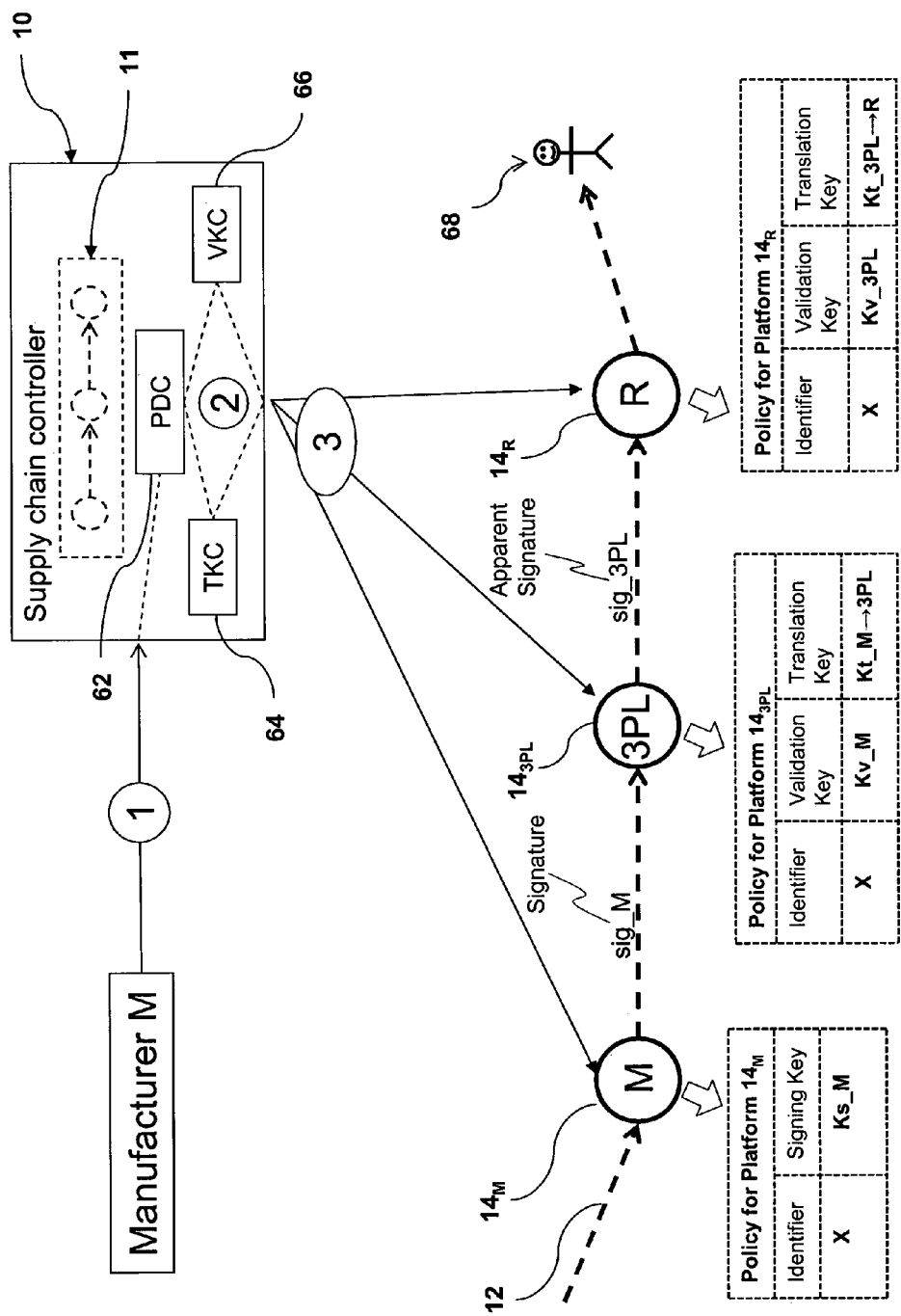
Figure 6 - Example I – simple supply chain

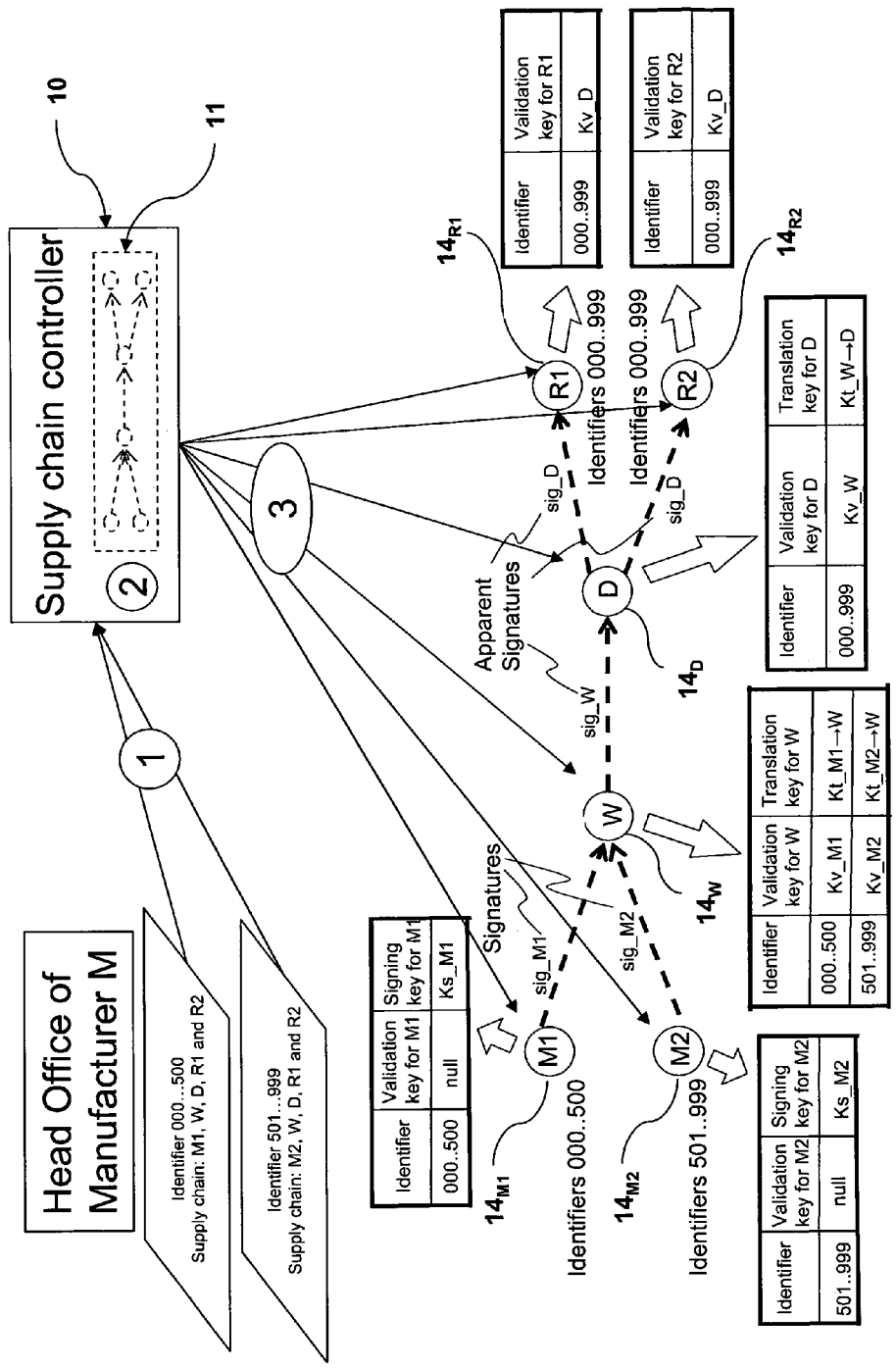
Figure 7 - Example II: combined policy/key store tables

CONTROL OF SUPPLY NETWORKS AND VERIFICATION OF ITEMS

This application is the U.S. national phase of International Application No. PCT/GB2009/002160 filed 9 Sep. 2009, which designated the U.S. and claims priority to EP Application No. 08253008.0 filed 12 Sep. 2008, the entire contents of each of which are hereby incorporated by reference.

TECHNICAL FIELD

The present invention relates to supply networks. More specifically, aspects of the present invention relate to control apparatus and methods for enabling verification by entities on a path across a supply network of an item identification means traversing said path, and to systems and methods using the above control apparatus and methods for signing, re-signing and verification of an item identification means.

BACKGROUND TO THE INVENTION

There is increasing economic incentive for companies to secure their own supply chains and to increase control of their distribution chains. Various processes are known for verifying movement of an item between different entities in a supply chain across a supply network. Verification may be desired for a variety of reasons. For example, there are commercial and safety requirements for a supply chain of branded goods, in particular pharmaceutical products, to be verified to avoid counterfeit products being introduced into an authorised supply chain.

Radio-Frequency IDentification (RFID) tags are well known. RFID tags are circuits in the form of label-like items that can be read (and sometimes also written on) by reader (and writer) units communicating with the tags at "RF" frequencies. RFID tags can generally be incorporated into or attached to products, packaging, animals or other items for example for the purpose of identification using radio waves. A particular application relates to tracking of items. RFID tags generally contain two parts: an integrated circuit for storing and processing information and an antenna for transmitting (and receiving) information to (and from) an RFID reader (and writer) device up to several meters away. RFID is mainly used today within enterprises' supply chain management applications to improve inventory visibility and prevent issues such product counterfeiting. Further details relating to the general field of RFID tag technology can found in, for example, Landt, Jerry (2001), "Shrouds of Time: The history of RFID", AIM, Inc.

Major pharmaceutical companies are actively involved in evaluating RFID as part of their anti-counterfeiting strategies, in addition to using other current covert authentication technologies and labour intensive inspections and investigations. For example, pharmaceutical companies want their distribution chains secure both in terms of product authentication and product pedigree.

Generally, the basic approach involves attaching an RFID tag to a product and giving a unique identifier to each item. Approaches that have previously been proposed integrate a product check with a pedigree record. A "product pedigree" is the historical record of a product lifecycle. It contains information about the product in the supply chain from the point of manufacture through one or more distributors until the product reaches its final customer. A product pedigree can also provide item level tracking, instead of batch level tracking—each item has a unique serial level identifier that uniquely identifies a product and its manufacture.

The following possibilities exist for implementing such product pedigree solutions:

1. Incorporating a unique identifier into the product. The unique identifier may be a 2-d barcode (data-metric barcode) or an RFID tag (e.g. EPC C1 Gen2), for example.
2. Tracking the product across the full supply chain, from the point of manufacturing through the distribution chain until the point of sale of the product.
3. Maintaining a database or a centralised server containing information about the pedigree of the product.

Although such an "e-pedigree" solution provides advantages in countering counterfeiting and diversion activities, there are still problems to resolve before a truly secure solution can be obtained:

1. Secure Tags: Current solutions do not use cryptographic mechanisms in the tags. Without a mechanism to protect a tag it may be hard to identify if a tag is original or just a "clone" (i.e. a copy of a tag arranged to give the same responses to challenges as the original). Cloning is a problem particularly if products take a long period to reach the market, allowing for the possibility of goods carrying cloned tags arriving on the market before the legitimate goods.
2. Integrity of Product Pedigree Records: Product pedigree may be largely incomplete. If a pedigree record misses important product information then it may be hard to decide whether the product is authentic or counterfeit. Collecting full pedigree and supply chain visibility information is a significant problem as companies are often unwilling to invest for little self-gain, and often have reservations about sharing their confidential business information.

PRIOR ART

There are several known mechanisms which aim to provide secure mass serialisation by using RFID technology, which can be grouped broadly according to the following categories:

Secure Label Attached to the Tag:

An RFID tag attached to a product contains a code that an RFID reader is able to authenticate. A code may be random, sequential, EPCglobal (see below) or embedded in the tag such as a tag "Unique Item Identifier" (UID). The code is then confirmed by network to a back-end system. The application running on the back-end system is then able to detect and manage unauthorised events. Authentication could also be done locally. A disadvantage of this system is that the labels are often not secure, or require proprietary installation of equipment. For systems that rely on a unique identifier created at tag manufacture, it is not hard for unauthorised parties to create or spoof such tags.

Product Pedigree Approach:

It is known to establish an Electronic Pedigree (also called an "e-pedigree"). An e-pedigree provides a record of data such as arrival and departure times of specific items, e.g. during manufacture, shipping and so on. An entity in a supply chain or other route receiving an item can access the e-pedigree to evaluate the item's authenticity. A proposed standardised e-pedigree approach using RFID technology is known as EPCglobal, further details of which van be found at www.epcglobalinc.org or from GS1 US, Princeton Pike Corporate Center, 1009 Lenox Drive, Suite 202, New Jersey 08648 Lawrenceville.

An aim of a product pedigree approach is to enable tracking and tracing of products across supply chains and verify the brand owner if a product appears to have been detected twice or if it appears to have been seen in an unusual location. An e-pedigree provides evidence of a product's chain of custody. It may detail arrival and departure times of the product through each of the supply chain partners involved, and can be created either on-demand or pre-emptively via secure track and trace queries. At the point of authentication, such supply chain information may be analysed to detect inconsistencies. For example, if a product doesn't have a plausible manufacturing and shipping record, it is possible that it is a counterfeit product fraudulently introduced into the supply chain.

A problem with this approach is that parties in the supply chain must share information in order to be able to detect anomalies. The manufacture and shipping information required for this approach is considered by many organisations to be sensitive information relating to their business operations.

Various commercial solutions exist in the mass serialisation domain:

Aegate, a UK based company, has created a bar coding and RFID solution to validate pharmaceuticals at the point of dispensing. This solution relies on manufacturers applying an RFID tag to each product container or package. The information about the product, its unique identifier and supply chain information are stored in a database managed by Aegate. This solution presents multiple drawbacks and it is not always compatible with supply chain needs. Firstly, the Aegate solution does not enable tracking and tracing of products across the supply chain from the manufacture to the retailer. It only provides a mechanism to check that a drug has been sold by the correct retailer. Secondly, the Aegate solution acts like a trusted information hub, with the pharmaceutical company needing to share with Aegate not only product information but also supply chain information (e.g. the identity and location of the pharmacy that will sell that specific product). The centralised role of Aegate is not acceptable to many countries/pharmaceutical corporations due to security and confidentiality issues.

3M Solutions has created a very complete product authentication system using serialisation and material security. The system can be provided as a security hosted service or as a product authentication system. This uses labels with properties on light management, optics, films adhesives and holography. The labels are then integrated with an RFID tag and a 2D data matrix barcode to provide mass serialisation solutions for product authentication. This system also provide a real-time track and trace solution based on the concept of product pedigree. Information captured from the tag by readers is constantly logged, analysed and monitored to detect deviation from the original supply chain path. The system thus provides a mechanism whereby customers are able to monitor their supply chains in close to real-time. This system has the following drawbacks, however:

The current version uses insecure tags. Without a mechanism to protect a tag it is hard to identify if the tag is original or just a clone. Adding properties to the tag such as light management, optics, films adhesives or holography can help but it is often not appropriate as this raises equipment costs and often requires manual facilitation.

The Product Pedigree approach requires that all parties in the supply chain must share information in order to be able to detect anomalies. Due to conflict of, interest across multiple supply chain partners this could be inappropriate.

Texas Instruments and Verisign Inc. have proposed a system including three main elements: usage of secure RFID tags, usage of a public key infrastructure (PKI) system to support public key cryptography, and a product authentication service to verify the identity and the e-pedigree of the products.

The RFID tag is programmed and locked with a Unique Item Identifier (UID). This code is programmed at the silicon level. The assumption is that it would be hard and expensive to clone these tags without a proper infrastructure to manufacture chips. However, this tag is not secure.

A digital signature is added into the memory of the tag as soon as the tag is assigned to a specific product, package, etc. A digital signature can be read by authenticated readers to validate the tagged product as it moves across the supply chain. In this case, the solution uses standards based public key technology and it assumes that the reader knows the appropriate manufacturer "public key" to decode and understand the signature.

An e-pedigree service collects information from the different authenticated readers distributed across the supply chain. The authenticated RFID readers are designed first to authenticate a tag digital signature and then to create an event for the e-pedigree service.

The authenticated reader also has the possibility to record additional events to the tag. These events can be considered as date/time stamps and are stored in the tag as event markers.

However, this Texas Instruments/Verisign proposal also a series of drawbacks:

Every piece of additional information stored in the tag augments the memory requirement for the tag. This could raise the tag cost and can also increase the complexity of the system.

The e-pedigree solution relies on a centralised server resulting in similar drawback to those of the Aegate solution described above.

The digital signature added into the tag memory remains constant throughout the product lifecycle. If a malicious user is able to clone the tag it would be hard for supply chain players to detect that the product is not authentic without referring to the centralised server.

Referring next to prior patent documents, International application WO 2006/015617 relates to methods and systems for secure management of data stored on electronic tags, and in particular discloses a method of secure management of data records stored in an RFID tag comprising data fields whose contents are provided by different parties, some of which contain public information data accessible to authorised end users. The data records are stored in encrypted form by encrypting data provided by different parties with different keys so as to set different access rights for content providers and end-users. The end-users are supplied only with the keys allowing access to information data fields, whereas proprietary data are accessible only to the data owners. The keys are provided to the users in encrypted form. The idea of RFID tags having user memory is well known, as is the idea of encrypting data with different keys for different sets of users. This document relates to such ideas and to the management of data on such tags. This does not make it relevant to the functionality of a control apparatus for use in enabling verification by entities on a path across a supply network of an item identification means traversing said path.

U.S. Pat. No. 5,469,363 relates to electronic tags with source certification capability, and in particular discloses an inventory control system which uses an electronic tag that keeps an unalterable log of each step in the handling of a controlled item. The tag communicates with a computer, and comprises a non-volatile computer memory element configured so that data may be written into unused portions of it, but so that no existing data can be overwritten or erased. Each tag contains an unalterable secret identification record that is only accessible to a user who has a valid password. Such a system aims to allow control and validation of supply chain paths, but does this in such a way as to enable the entire supply path to be seen by any downstream party.

SUMMARY OF THE INVENTION

According to a first aspect of the present invention, there is provided control apparatus for use in enabling verification by entities on a path across a supply network of an item identification means traversing said path, the network comprising: at least one supplier entity able to introduce into the network an item identification means having stored therein an item identifier and a digital signature associated, with said supplier entity, and to forward said item identification means along a path across said network; at least one intermediate entity able to receive said item identification means from said at least one supplier entity or from another intermediate entity in said network and forward said item identification means along said path; and at least one receiver entity able to receive said item identification means from an intermediate entity in said network; the control apparatus comprising:

path determination means arranged to determine path data in respect of an item identification means, said path data relating to at least one valid path by which said item identification means may traverse the network, said path data comprising data in respect of each of said at least one intermediate entity and said at least one receiver entity indicative of one or more upstream entities from which said item identification means may be received when traversing the network along a valid path; and translation key means responsive to said path determination means and arranged to provide for said at least one intermediate entity a translation key, said translation key enabling translation by said intermediate entity of a digital signature associated with an upstream entity into a new digital signature associated with said intermediate entity in the event that said intermediate entity receives an item identification means having stored therein said digital signature associated with said upstream entity.

The path determination means may be arranged to determine path data relating to different valid paths in respect of each of plurality of item identification means, thus allowing for preferred embodiments to operate in relation to more complex supply networks having paths that converge or branch, with different paths being valid for different products, for example.

The control apparatus may also comprise private key means for providing a private key to said at least one supplier entity whereby to enable said supplier entity to store in said item identification means a digital signature associated with said supplier entity. An alternative to this, applicable in situations where it is not appropriate for the control apparatus to release private keys even to supplier entities for example, is for supplier entities to be provided with tags having appropriate digital signatures already stored therein.

The control apparatus further comprises validation key means responsive to the path determination means and arranged to provide for at least one intermediate or receiver entity a validation key, said validation key enabling validation by said intermediate or receiver entity of a digital signature stored on an item identification means in the event that said digital signature is a digital signature associated with an upstream entity from which said item identification means may be received by said intermediate or receiver entity when traversing the network along a valid path. The validation key means may be arranged to provide at least one intermediate or receiver entity with a plurality of different validation keys, each of said plurality of validation keys being associated, with one or more item identifiers stored in one or more item identification means, respective validation keys enabling validation by said intermediate or receiver entity of a digital signature stored in an item identification means having an item identifier with which said validation key is associated. In embodiments intended to operate in relation to RFID tags, the validation key means would in general be arranged to provide validation keys enabling validation using an RFID reader device of digital signatures stored on the RFID tags.

The translation key means may be arranged to provide at least one intermediate entity with a plurality of different translation keys, each of said plurality of translation keys being associated with one or more item identifiers stored in one or more item identification means, respective translation keys enabling translation by said intermediate entity of a digital signature stored in an item identification means having an item identifier with which said translation key is associated. This may enable a particular supply chain entity to treat products in different manners in dependence on the identifiers stored on tags associated with them, for example.

In embodiments intended to operate in relation to RFID tags, the translation key means would in general be arranged to provide translation keys enabling translation and re-writing on the RFID tags of digital signatures using an RFID writer device.

According to a second aspect of the present invention, there is provided a signing system for enabling verification of an item identification means traversing a path across a supply network, said signing system comprising a control apparatus according to the first aspect and at least one supplier entity signing module, said signing module being arranged to store in an item identification means a digital signature associated with said supplier entity.

The digital signature associated with said supplier entity may determined in dependence on a private signing key received from said control apparatus. Alternatively, as explained in relation to the first aspect, supplier entities may be provided with tags having appropriate digital signatures already stored therein, for example.

In embodiments intended to operate in relation to RFID tags, the signing module in general would comprise at least an RFID writer.

According to a third aspect of the present invention, there is provided a re-signing system for enabling verification of an item identification means traversing a path across a supply network, said re-signing system comprising a data receiver in communication with a control apparatus according to the first aspect and at least one intermediate entity re-signing module, said re-signing module being arranged to receive a translation key from said control apparatus, said re-signing module comprising:

translation means for using a translation key to translate a digital signature associated with an upstream entity into a digital signature associated with said intermediate entity.

In order to enable the re-signing module to perform validation operations as well, it may also be arranged to receive a validation key from the control apparatus, with the re-signing module further comprising validation means for using a validation key to validate a digital signature stored on an item identification means.

In embodiments intended to operate in relation to RFID tags, the re-signing module in general would comprise an RFID reader and an RFID writer, which may be in the form of one combined reader/writer device or as separate devices.

According to a fourth aspect of the present invention, there is provided a verification system for verification of an item identification means traversing a path across a supply network, said verification system comprising a data receiver in communication with a control apparatus according to any of claims 1 to ??? and at least one receiver entity verification module, said verification module being arranged to receive a validation key from said control apparatus, said verification module comprising validation means for using a validation key to validate a digital signature stored on an item identification means.

In embodiments intended to operate in relation to RFID tags, the verification module would in general comprise at least an RFID reader.

Related to the first aspect above, there is also provided a control method for enabling verification by entities on a path across a supply network of an item identification means traversing said path, the network comprising: at least one supplier entity able to introduce into the network an item identification means having stored therein an item identifier and a digital signature associated with said supplier entity, and to forward said item identification means along a path across said network; at least one intermediate entity able to receive said item identification means from said at least one supplier entity or from another intermediate entity in said network and forward said item identification means along said path; and at least one receiver entity able to receive said item identification means from an intermediate entity in said network; the control method comprising:

determining path data in respect of an item identification means, said path data relating to at least one valid path by which said item identification means may traverse the network, said path data comprising data in respect of each of said at least one intermediate entity and said at least one receiver entity indicative of one or more upstream entities from which said item identification means may be received when traversing the network along a valid path; and providing for said at least one intermediate entity a translation key determined in dependence on said path data, said translation key enabling translation of a digital signature associated with an upstream entity into a new digital signature associated with said intermediate entity in the event that said intermediate entity receives an item identification means having stored therein said digital signature associated with said upstream entity.

Related to the second aspect above, there is also provided a signing method for enabling verification of an item identification means traversing a path across a supply network, said signing method comprising performing the above control method, and further comprising at least one supplier entity storing in an item identification means a digital signature associated with said supplier entity.

Related to the third aspect above, there is also provided a re-signing method for enabling verification of an item identification means traversing a path across a supply network, said re-signing method comprising:

communicating with a control apparatus performing the above control method whereby to receive a translation key from said control apparatus; and using said translation key to translate a digital signature associated with an upstream entity into a digital signature associated with said intermediate entity.

Related to the fourth aspect above, there is also provided a verification method for verification of an item identification means traversing a path across a supply network, said verification method comprising:

communicating with a control apparatus performing the above control method whereby to receive a validation key from said control apparatus; and using said validation key to validate a digital signature stored on an item identification means.

It should be noted that digital signatures and their use in general in relation to RFID tags are well-known. For the avoidance of doubt, however, it should be understood that a digital signature in general is the output of an algorithm, or of an electronic device implementing the algorithm, for example, given a message and a private key. In relation to RFID tags, the tag identifier generally serves as the "message", but other data may also take this role. A validation operation in respect of a digital signature or of a tag having a digital signature stored therein generally involves using an appropriate algorithm (run on an appropriate electronic device, for example) in conjunction with an appropriate public key to accept or reject the signature.

Various possible advantages of preferred embodiments of the invention such as those to be explained in detail below will now be outlined briefly.

Preferred embodiments of the invention may be made resistant to attacks, and less vulnerable to single point failure. Corrupting a re-signing platform does not provide any significant advantage to a malicious attacker, because re-signing platforms generally do not store private keys but only re-signing keys to perform signature translation.

Preferred embodiments of the invention may enable offline product verification. Product verification can be performed offline without the need to query a centralised supply path management server. Supply chain partners generally only need to check that the goods have arrived from one of their (correct) immediate upstream partners. A record of previous tags seen by the platform may be kept if cloning is believed to be a problem, however.

Preferred embodiments of the invention enable a reduction in the amount of information that needs to be exchanged. Trace information need only be held on the tag for the immediate upstream leg of the supply chain. The signature need not reveal the path that the tag has traversed.

Preferred embodiments of the invention may utilise current RFID tag technology, do not require any additional computational power to be provided on the tags, and may be compatible with current EPC tags. They enable solutions which are very scalable in terms of memory in the tag.

It will therefore be understood that preferred embodiments of the invention may be used to give companies control and visibility of their routes to market, and to enable prevention of pirated/counterfeited products being introduced into the market through legitimate outlets. Organisations can define business rules that dictate how the supply chain should operate and how products should flow across the supply chain. The above may be achieved in a manner that overcomes problems in prior art systems relating to the amount and type of information that supply chain partners must share with each other in order to achieve this, however.

BRIEF DESCRIPTION OF THE DRAWINGS

A preferred embodiment of the present invention will now be described with reference to the appended drawings, in which:

FIG. 1 is a schematic diagram illustrating how a secure supply chain may operate;

FIG. 2 illustrates a proxy re-signature scheme;

FIG. 3 shows how path verification may be achieved using a proxy re-signature scheme;

FIG. 4 shows the possible architecture of a re-signing platform;

FIG. 5 illustrates the possible structure of the memory of an RFID tag; and

FIGS. 6 and 7 show examples of supply chain networks and illustrate how each may be controlled by methods and apparatus according to preferred embodiments of the invention.

DESCRIPTION OF PREFERRED EMBODIMENTS OF THE INVENTION

Prior to describing in detail how preferred embodiments may operate, an explanation of a scenario in which preferred embodiments may be used will be described with reference to FIG. 1. Reference will be made to the concept of a "Physical VPN"—it should be noted however that the acronym "VPN" (standing for "Virtual Private Network") is taken from secure network routing schemes, which rely on a single trusted network operator. In the present context, a "Physical VPN" can be taken to mean a Secure Physical Supply Chain Path.

We consider the situation where a party wishes to define one or more acceptable supply routes between authorised nodes for different products. For example a manufacturer may specify an authorised distribution chain for its goods to flow to franchise dealers. A re-signing platform should be able to check that a product has arrived along an authorised upstream path. As discussed earlier, it may, however, be desired by one or more parties in the supply chain that the re-signing platform should not know which parties were involved in the upstream part of the supply chain, in order to preserve the confidentiality of sensitive business information.

This approach can be used to prevent counterfeit goods entering the supply path, and can also be used to control the supply chain to detect grey market and diverted goods. For example, counterfeit goods will (in general) not have travelled a prescribed path from the legitimate manufacturer. A product that has been diverted from another market will fail to have followed the correct distribution chain.

Referring to FIG. 1, we consider the case of a supply chain controlled by a central service provider. In this example, a supply chain comprising one Manufacturer "M", one Wholesaler "W" and one Retailer "R" in series is illustrated, although it will be understood that more complex supply chains are also possible, involving additional parties, which need not be simply in series—there may be several parties of each type in the supply chain. It will be noted that the manufacturer M is shown as being able to inject items into the supply chain having identifiers anywhere from 0 to 999, whereas the wholesaler W is shown as being able to receive items having identifiers only from 0 to 500—this is to indicate that there may be an alternative route to a different wholesaler (not shown) within the same supply chain network who is intended to receive and forward items having identifiers from 501 to 999. Likewise, retailer R is shown as being able to receive only items having identifiers from 0 to 250—this may be because there are other retailers (again not shown) for which items having identifiers from 251 to 999 are destined.

The three main steps are as follows:

Supply Chain Controller Builds Physical VPN:

Firstly, a supply chain controller 10 (controlled by or acting as a trusted third party on behalf of manufacture M, for example) determines or is provided with a model 11 indicative of one or more valid supply chain paths 12. It then distributes policies and keys for permitted supply chain paths for one or more specific products or types of products to trusted re-signing platforms 14 of each of a plurality of supply chain partners (e.g. parties M, W and R). Each policy contains: the identifiers of products to be received; a public key used to verify that the previous holder of the product is an authorised upstream supply chain partner; and the private key with which the new product holder will be able to re-sign product tags 15. Verification performed in relation to the product tags 15 can in general be taken to correspond to verification of products 16 with which the tags are associated.

Product Validation at the Re-Signing Platform:

When a product arrives at a specific supply chain location the product is verified. During this process the re-signing platform at that location checks a digital signature contained in the product tag and verifies that the previous holder of the tag is an authorised upstream supply chain partner. Only if the signature passes the validation check is a re-signing operation permitted.

Product Re-Signing at the Re-Signing Platform:

If the signature does pass the validation check, the re-signing platform then writes the new signature onto the tag. With this operation the reader marks the product so that any downstream receiver can consider the product authentic.

It will be understood that the overall Validation and Re-Signing procedure performed at a re-signing platform may involve various sub-stages, symbolised by the individual boxes shown in the diagram of the re-signing platforms 14 in FIG. 1. After physically receiving a product with an associated tag, a sub-stage shown as "Validate" may involve checking a product identifier in the tag memory to ensure that the product belongs to the correct supply chain (i.e. that the ID belongs to the path concerned); and a sub-stage shown as "Verify" may involve checking the integrity of a signature contained in the tag memory. If these checks are passed, a stage shown as "Certify" is performed involving writing a new signature into the tag. In general, for simplicity, we will refer to the overall procedure as containing a Validation stage and a Re-Signing stage, however.

At this stage it will be understood that the re-signing of a tag may need to be performed at isolated points within a supply chain such that a legitimate upstream supply chain path can be validated at any point by verifying the previous signature. Three different approaches to achieving this will now be discussed, as follows:

(i) Using a re-signing platform with public keys to perform route validation and private keys used to create a new replacement signature: In this approach, the re-signing platform contains private and public keys. The public keys are associated with specific upstream supply chain paths. The private keys are used to produce tag signatures for specific downstream paths. The re-signing platform uses the private key associated with a shipment to digitally sign the product identifier obtained from the tag. Each private key is unique to the platform. The signature is written into additional memory registers on the identification tag, or may be written onto a separate additional electronic tag. Any partner in possession of the public key may validate that the product is signed with the correct key and therefore has been routed via the expected supply chain party.

Such a simple mechanism has a major drawback. It relies on the assumption that the private key is not mis-used. With this design the system has to trust the owner of the private key. By mis-using a private key a supply chain partner may introduce counterfeit or re-directed goods back into the authenticated supply chain. Also since the re-signing platform is not secure it may be possible to hack the platform and thereby introduce illicit products into the supply chain.

(ii) Trusted re-signing platform with public keys to perform route validation and private keys held in secure storage and used to create a new replacement signature: In this approach, Trusted Computing technology is used in order to provide increased security. A computing platform connected locally to a tag reader, or incorporated into the reader itself provides a localised validation and re-signing operation. The use of trusted computing allows the service provider to operate the validation and re-signing operations in a secure environment where neither the reader operator nor other parties can tamper with it. The re-signing platform acts as a secure proxy for the online service provider and protects the private keys used in the signing operation, such that they cannot be leaked to the reader operator or any other party.

While a Trusted Computing approach has advantages in terms of security features, the need for a specific hardware module could be a problem for embedded devices. If the re-signing device is embedded in an RFID reader or within a device that does not yet support this type of security feature it would be necessary to implement the intrinsically insecure approach described above.

In view of the above, preferred embodiments to be described below are intended to be used in conjunction with a re-signing platform as follows, that does not need to store the private keys required to perform the re-signature of the information contained into the tag.

(iii) Re-signing platform based on a proxy re-signing algorithm, using public keys to perform route validation and translation keys to re-encrypt the existing signature: In relation to the embodiment to be described, a re-signing platform effectively acts as a signature translator between a previous holder of a product in the supply-chain and the next holder. Since it does not possess the private keys itself, it cannot introduce and sign products appropriately itself, but can merely translate signatures on tags arriving from validated routes. When a product arrives at a specific supply chain location the product is verified. The re-signing platform then re-encrypts the existing signature on the tag, converting it from a signature of the previous holder into a signature of itself.

In this approach, the manufacturer generates the first signature on the information contained in the tag and the intermediate re-signing platforms across the chain convert it into subsequent signatures. As with the second approach above, this process can be used to prove that a product has followed a particular supply chain path, but by giving each re signing platform only translation keys, corrupting a re-signing platform would only liberate keys that have no use without access to legitimate product flows. If a product has not gone through all the previous validity checks en route from the manufacturer, it will in general not be accepted at subsequent "checkpoint" locations. Therefore, even an attacker that has compromised a check-point cannot convincingly forward tags unless they are authentic.

With an appropriate mechanism of key management the system need only disclose public keys to verify product authenticity and re-signing keys to generate the authentic path across different re-signing platforms.

Prior to describing preferred embodiments, an explanation of the concept of a proxy re-signature scheme and an example of path verification using a proxy re-signature scheme will be given with reference to FIGS. 2 and 3.

Proxy Re-Signature Schemes

A proxy re-signature is a primitive where a proxy is given some information which allows the transforming of one signature into another, for example Alice's signature into Bob's signature. However, the proxy does not control the private key associate to Alice or Bob therefore it cannot generate the signature for either Alice or Bob. This primitive was introduced by M. Blaze, G. Bleumer & M. Strauss in "Divertible Protocols and Atomic Proxy Cryptography", Advances in Cryptology—EUROCRYPT '98, volume 1403 of LNCS, pages 127-144, 1998, and has been explored further in "Proxy Re-Signatures: New Definitions, Algorithms, and Applications" by Giuseppe Ateniese & Susan Hohenberger, 28 Nov. 2005.

With reference to FIG. 2, the proxy translates a perfectly-valid and publicly-verifiable, signature from (for example) Alice into one from Bob. Given a message 'm' and signing that message with Alice's private key generates a signature Ks_a(m), signing the same message with Bob's private key generates signature Ks_b(m). In the proxy re-signature scheme, a proxy would receive the signature from Alice Ks_a(m) and convert it into a valid signature from Bob Ks_b(m). A property of proxy re-signature is that the "translation" from one signature to another can be performed in sequence and multiple times by distinct proxies without requiring the intervention of the signing entities (i.e. the owners of the private keys). In this way, the private keys can always remain offline and protected. All the signatures are publicly verifiable signatures as if they were signed by the real owner of the distinct entities.

With reference to FIG. 3, an example will be described illustrating how a proxy re-signature scheme provides proof that a certain path has been taken. In the simplest case, the basic idea is that each node in the path (except the first) is only given a re-signature (translation) key which allows it to translate signatures from adjacent nodes, but not a signing key. For instance, given three nodes in a path A, B, C, we give the first node A's signing key, while the second node is only able to translate signatures from A into signatures from B, without storing B's private key. A third node will translate signatures from B into signatures from C without storing C's private key. Any user after C will have only to verify C's signature with a public key even if several nodes precede C in the path.

As long as the distribution of the keys required to translate the signatures from different adjacent entities can be controlled, it is generally possible to prove that a certain path has been taken.

Turning now to a suitable proxy re-signing scheme for re-signature platforms operating in relation to embodiments to be described, such a scheme should in general be the following:

Unidirectional: This means that the scheme only allows the re-signing to be performed in one direction (e.g. from Alice to Bob but not from Bob to Alice). For the supply chain application to be described, this is appropriate where tags are only intended to flow in one direction.

Transparent: This means that the proxy is transparent in the scheme, meaning that a user may not even know that a proxy exists. For the supply chain application to be described, this means that a user may only learn that a product is authentic but does not need to learn anything unnecessary about the supply chain.

Collusion-Resistant: This means that even if proxies share information, they should still not be able to re-compute the private key of any other member of the supply-chain.

A unidirectional scheme based on that suggested by Ateniese and Hohenberger (as discussed above) may be suitable for some embodiments, but a scheme with similar properties but stronger security requirements may well be preferred.

With reference to a generic unidirectional re-signature scheme that translates information from Alice to Bob, the following terminology is used:

Alice Private Key=Ks_a
Alice Public Key=Kp_a
Bob Private Key=Ks_b
Bob Public Key=Kp_b
Translation Key from Alice to Bob=Kt_a→b 1. Message 'm' signed by Alice is 'Ks_a(m)'≡Alice Signature
2. Proxy can translate this signature from Alice to Bob by: Kt_a→b(Ks_a(m))≡Bob's Signature Note that Bob's signature is equivalent to Ks_b(m). Any user that has access to Bob's public key can verify the signature generated by the proxy.

Re-Signing Platform

With reference to FIG. 4, which illustrates the possible architecture of a re-signing platform 14 for RFID tags and the external components with which it may interact, the components and operation of a re-signing platform for use in conjunction with a preferred embodiment will now be described:

Generally prior to receipt of a tagged product from an upstream neighbour in the supply chain, the re-signing platform 14 will have received and stored data from the supply chain controller 10, including any necessary keys, policies etc., which will be explained in more detail later. Once a tagged product is received, the following steps are performed:

1. Reading of Tag: The item signature and identifier are read from the tag by RFID reader/writer 48. The reader passes the tag information to the re-signing platform 14. The information contains an ID (e.g. EPC 96 bit) and the signature.

2. Retrieval of Validation Key: The platform checks the policy manager 44 to see if there is a policy (represented by policy table 43) associated with that specific tag identifier. If the specific policy is present then the policy manager 44 gets the public validation key associated with the identifier.

3. Signature Validation and Possible Uniqueness Test: The platform decrypts the signature using the validation key and checks the results against the identifier of the tag. If the values match then it can be determined that the tag has followed a legitimate path in the supply chain. The platform may also perform a uniqueness test. It checks that the tag is unique and that no tag with a similar ID has been previously validated by the platform. This check can be performed by storing the previous identifiers in a database, or by including previous identifiers in a bloom filter 46 to reduce storage overheads.

4. Retrieval of Translation Key: If the product is authentic then the policy manager instructs the re-signing module 45 to translate the signature on the tag. This module will access the translation key for that specific identifier.

5. Creation of New Signature: The re-signing module generates a new signature using the translation key as described by a unidirectional proxy re-signature, and the previous signature held by the tag. Following this action the platform communicates to the reader/writer 48 to write the new signature on the tag.

FIG. 4 also indicates that the re-signing platform 14 may be linked to Supply Chain Systems 42. These may include a back-end system implementing company supply chain functions. When a product has been checked by a re-signing platform the information that the product is authentic may be passed to such a system for internal organisation purposes such as financial control or inventory management, for example.

FIG. 5 illustrates the types of data that may be held in the memory of a tag 15. One portion 51 of the memory may hold the item identifier. In general this may remain unchanged for the life-time of the tag, or at least for the period during which the associated item moves along the supply chain. Another portion 52 may hold the signature of the current holder of the tag. This portion may therefore be re-written by one or more re-signing platforms as the associated item moves along the supply chain. There may also be other portions of memory for other purposes, such as a portion 53 for additional signatures. This may be for managing the flow of products across the path in cases where products get sent into multiple downstream paths, for example. In such cases it may be hard to confirm that the products have come from a particular supplier, as only the previous entity on the path may be "visible" to the current entity. To overcome this problem a second signature can be stored that is common to all products from that supplier.

With reference to FIGS. 6 and 7, examples of supply chains operating under the control of control apparatus according to preferred embodiments will be described. Such supply chains may apply in relation to the distribution of pharmaceutical or other products for example.

Generally (but not necessarily) under the control of or in response to information received (Step 1) from a manufacturing organisation M, or a supply chain controlling organisation, or perhaps an agent acting for such an organisation, supply chain controller 10 (controlled by or acting as a trusted third party on behalf of manufacture M, for example) determines one or more authorised paths 12 across the supply chain (Step 2). In general, the authorised path or paths are unidirectional (i.e. the same item is not generally intended to be passed in both directions between any two entities), although FIG. 7 illustrates that paths may branch, converge etc.

The supply chain controller 10 may receive information on how products should flow in a supply chain which may include one or more entities of any or all of the following types: manufacturers ("M"), wholesalers ("W"), distributors ("D"), Third Party Logistics operators ("3PL"), retailers ("R"). Other types of entity are also possible. (NB Third party logistics operators may be subcontracted carriers of goods which are operated neither by the shipper nor by the receiver (e.g. regular mail service providers or courier firms such as DHL or TNT).

The supply chain controller 10 generates, coordinates and distributes the various validation and translation keys as required or applicable among the different re-signing platforms 14 operated by the respective entities on the authorised path or paths (Step 3).

The authorised path may be determined by a sequence of keys: for example, the private key of a first entity on the path, a translation key from the first entity to an intermediate entity, and a translation key from the intermediate entity to an entity at a supply chain end-point. Each re-signing platform 14 at entities other than the first may validate that the product is flowing through the authorised path 12 using the appropriate validation public key to verify that the tag has arrived via the correct upstream path, and may then translate the signature into that of one or more subsequent entities entitled to receive the product next before forwarding the product and tag to such an entity. Alternatively, if the entity is a supply chain end-point entity such as a retailer, it can then "kill" the tag and erase the signature.

Private keys in general do not leave the controller. An exception to this rule in some circumstances may be a private key used by a manufacturer to inject a new product into a supply chain by creating an original signature. The private key may in some cases be provided to the re-signing platform of the manufacturer (or other such "originating party" in the supply chain), although this need not be done—an alternative would be for the originating party in the supply chain to be provided (by the party controlling the supply chain, for instance) with "pre-signed" tags, i.e. tags that already have stored therein a verifiable private signature indicative of products originating from that particular originating party. This may be applicable if, for example, manufacturing is outsourced to a party which may then insert the items into the supply chain without needing to be given control or information relating to the tag keys or signature.

With reference to FIG. 6, a simple supply chain example will now be described. This supply chain is composed of Manufacturer M, Third Party Logistics operator 3PL and Retailer R.

In Step 1, the manufacturer M sends information about a valid supply chain route for a specific product to a path determination component 62 (shown as PDC in FIG. 6) of the supply chain controller 10. This determines a model 11 of the actual supply chain path 12 that the product is allowed to follow from manufacturer M via third party logistics operator 3PL and on to retailer R. It will be noted that manufacturer M and a re-signing platform $14_M$ operating for manufacturer M are shown as separate features—this is to indicate that the overall "controlling" role performed by or on behalf of manufacturer M and the validation and re-signing role performed by or on behalf of manufacturer M may well be separated, not only in terms of location, but also in the sense that the respective roles need not be under the control of the same entity at all.

In Step 2, path determination component 62 of controller 10 identifies the different re-signing platforms $14_M$, $14_{3PL}$ and $14_R$ in the path 12 from manufacturer M to retailer R, and the supply chain interactions that are to be permitted between them in respect of the product when traversing the valid path. The following keys are then generated in dependence on the determined path information: a private 'signing' key at least in respect of manufacturer M (as in this example, it is intended that manufacturer M will store a signature on tags it is going to inject into the supply chain); public 'validation' keys in respect of third party logistics operator 3PL and retailer R; and appropriate translation keys at least for third party logistics operator 3PL, and also for retailer R if, for example, it is not in fact the final party at which the product tag is intended to be used—as illustrated by the path line from retailer R to customer 68, there may be situations where the path 12 extends further to customer 68 who may then perform a validation operation in respect of a tag bought from retailer R, for example. There may also be entities on the path 12 prior to those shown, as illustrated by the path line in to manufacturer M. Also, in relation to more complex networks with multiple paths, an entity acting as the first entity on one path may at the same time take a role as an intermediate or final entity in respect of different products travelling on a different path, for example.

A policy can also be generated for the re-signing platform specifying how different products should be allowed to flow along different routes within the network (this will be explained further in relation to FIG. 7, but for simplicity, only one route is shown in the example of FIG. 6, all tags being shown as having a common identifier "x").

In order to illustrate that keys of different types may be generated for distribution to different entities, two further functional components of controller 10 are shown in FIG. 6, namely a translation key component 64 (shown as TKC) and a validation key component 66 (shown as VKC). A signing key component could also have been shown, but this has been omitted in order to avoid over-crowding the figure. It will be understood that these components and the path determination component 62 need not be separate physical components of controller 10. The functions attributed to them may all in fact be performed by the same processor in the supply chain controller 10, for example, with the results of a path determination routine being used in subsequent key generation and key distribution routines. For this reason, in the remainder of the description of preferred embodiments, reference will generally be made to the respective path determination and key generation/distribution functions as being performed simply by the controller 10, which can nevertheless be regarded as containing a path determination component 62, a translation key component 64, (optionally) a validation key component 66 and if required a signing key component as well.

In Step 3, the controller 10 distributes the following information:
To re-signing platform $14_M$ of manufacturer M: Private Key: Ks_M
To re-signing platform $14_{3PL}$ of operator 3PL: Translation Key: Kt_M→3PL
To re-signing platform $14_R$ of retailer R: Translation Key: Kt_3PL→R Using the private signing key Ks_M, manufacturer M is able to sign tags associated with items it is injecting into the supply chain with its digital signature sig_M. After receipt and possible validation by operator 3PL of tags from manufacturer M, operator 3PL can then use translation keys Kt_M→3PL to translate the signatures on the tags into its own "apparent" digital signature sig_3PL before forwarding the tags to retailer R.

The public validation keys may also be made available to one or more of the different supply chain partners, enabling them to check the validity of signatures on tags they receive. If so, the respective supply chain parties may use them to check the validity of signatures before proceeding further, or they may proceed without carrying out such a check.

In this example, a simple policy is distributed to manufacturer M, operator 3PL and retailer R. The policies for the respective re-signing platforms $14_{3PL}$ and $14_R$, of operator 3PL and retailer R may dictate which validation and translation keys should be used to validate and re-sign tags having different tag identifiers relating to certain goods, but in this example, as all tags are shown as having a common identifier "x", there is no need for the platforms to have different keys for different tag identifiers. (As will become apparent later with reference to FIG. 7, a manufacturer's policy may dictate, for example, that different private keys should be used to generate initial signatures for tags intended to be associated with different goods, or batches of goods.)

Once each re-signing platform has received any appropriate policy specifying the possible validation and translation keys to be used for permitted product identifiers, along with the associated keys, the physical VPN is ready to be used.

Referring now to FIG. 7, a more complex supply chain example will be described. This supply chain is composed of a first Manufacturer M1, a second Manufacturer M2, Wholesaler W, Distributor D, a first Retailer R1 and a second Retailer R2.

It will be noted that in this example, two different manufacturing entities M1 and M2 are shown. These may be autonomous, or may be factories in different geographical locations operating for the same company for example. In this example it may be assumed that they are simply two different factories under the common control of the Head Office of one manufacturing company, but it will be understood that this need not be the case. Likewise, two different retailing entities R1 and R2 are shown. This example is intended to illustrate how an embodiment may operate in relation to a supply chain that is not simply serial, e.g. one having two or more "entry-points" and "end-points", with paths that converge and branch between the respective entry-points and end-points.

Two separate path sections from the respective manufacturers M1 and M2 converge at the common wholesaler W, and two separate path sections branch out from the common Distributor D to the respective retailers R1 and R2. Between these "common" nodes W and D, there is a common path section along which all of the products may flow, irrespective of which manufacturing point they originate from, and irrespective of which retailer they are destined for. It will be understood that with such a supply chain network, four different paths are possible. More complex networks are also possible, of course, involving several different paths, two or more convergence points and branching points, two or more entities performing corresponding functions at any of a variety of equivalent stages in a supply network, a mixture of more direct and less direct paths, and other such variations.

In this example there are two different product ranges produced respectively by manufacturers M1 and M2. Manufacturer M1 produces products with an ID range from 0 to 500 while Manufacturer M2 produces different, similar or perhaps identical products with an ID range from 501 to 1000.

In Step 1, the head office of manufacturer M sends information about valid supply chain routes for specific products to controller 10. These specify paths that various products should follow. The two different product ranges will be produced by different manufacturers but converge into a common supply chain path section.

In Step 2, controller 10 identifies the different re-signing platforms $14_{M1}$, $14_{M2}$, $14_W$, $14_D$, $14_{R1}$ and $14_{R2}$ in the supply chain network linking manufacturers M1 and M2 to retailers R1 and R2 via common wholesaler W and common distributor D. It then generates the various signing, validation and translation keys in respect of the various supply chain entities, and generates policies to indicate different associations between keys and identifiers.

In Step 3, controller 10 distributes the following keys to the respective re-signing platforms of the appropriate entities:

To platform $14_{M1}$ of manufacturer M1: Private Key: Ks_M1 (associated with ID 000:500)
To platform $14_{M2}$ of manufacturer M2: Private Key: Ks_M2 (associated with ID 501:999)
To platform $14_W$ of wholesaler W: Translation Key: Kt_M1→W (associated with ID 000:500)
To platform $14_W$ of wholesaler W: Translation key: Kt_M2→W (associated with ID 501:999)
To platform $14_D$ of distributor D: Translation Key: Kt_W→D (associated with ID 000:999)
To platform $14_{R1}$ of retailer R1: Translation Key: Kt_D→R1 (associated with ID 000:999)
To platform $14_{R2}$ of retailer R2: Translation Key: Kt_D→R2 (associated with ID 000:999)

Using its private signing key Ks_M1, manufacturer M1 is able to sign tags associated with items it is injecting into the supply chain with its own digital signature sig_M1. Similarly, using its private signing key Ks_M2, manufacturer M2 is able to sign tags with its digital signature sig_M2. After receipt and possible validation by wholesaler W of tags from manufacturer M1, wholesaler W can then use translation key Kt_M1→W to translate the signatures on those tags into its own "apparent" digital signature sig_W, if necessary checking first that the tag IDs conform with the policy. Similarly, wholesaler W can use translation key Kt_M2→W to translate the signatures on tags received from manufacturer M2 into the same apparent signature sig_W before forwarding the tags to distributor D. Distributor D can then use its translation keys Kt_D→R1 and Kt_D→R2 to translate the apparent signature sig_W of wholesaler W into its own apparent signature sig_D before forwarding the respective groups of tags to their respective receivers R1 and R2.

The public validation keys are made available to the different supply chain partners in order to allow them to check the validity of the respective product signatures.

It will be noted that the respective validation keys may be associated with different product identifiers. Different incoming supply path sections will (in general) provide tags signed by different upstream partners in the supply chain. Translation keys unique to each upstream signature can be generated to produce a single output signature for downstream partners depending on the requirements of the situation.

If multiple downstream path sections exist, it may not be possible to control which goods flow down which path using this approach however (since all paths may be validated with the same validation key against signature). To control the validity of discrete downstream path sections, different tags' signatures can be translated into different output signatures using different translation keys. The appropriate validation key for each signature may then be shared selectively with appropriate downstream partners. If this approach is taken it may make it more difficult for outside parties to validate that the associated goods have come a particular supplier (since they would need all possible validation keys). To overcome this problem a second signature can be generated that is common to all products from that supplier. This second "common" signature can be generated using a second set of translation keys, for example.

Once each re-signing platform has received the relevant keys and policies, the physical VPN is ready to be used. As explained above, the re-signing platform may thus write "trace" information in the form of a revised signature onto the tag. This information may then be used by each re-signing platform further downstream along the path to check that the product has arrived through a valid supply chain path.

The invention claimed is:

1. A control apparatus for use in enabling verification by entities on a path across a supply network of an item identification means traversing said path, the network comprising: at least one supplier entity operable to introduce into the network an item identification means having stored therein an item identifier and a digital signature associated with said supplier entity, and to forward said item identification means along a path across said network; at least one intermediate entity operable to receive said item identification means from said at least one supplier entity or from another intermediate entity in said network and forward said item identification means along said path; and at least one receiver entity operable to receive said item identification means from an intermediate entity in said network; the control apparatus comprising:

a processor configured to operate a path generator and a translation key provider, wherein:
the path generator is configured to determine path data in respect of an item identification means, said path data relating to at least one path across the network deemed to be a valid path, each said valid path being a path by which said item identification means is permitted to traverse the network from a supplier entity to a receiver entity via one or more intermediate entities each of which is deemed to be authorized to forward the item identification means to or receive the item identification means from another entity on said valid path, said path data comprising:
data in respect of said at least one intermediate entity indicative of one or more entities upstream thereof from which said item identification means is permitted to be received when traversing the network along one said valid path; and
data in respect of said at least one receiver entity indicative of one or more entities upstream thereof from which said item identification means may is permitted to be received when traversing the network along one said valid path; and the translation key provider is responsive to said path generator and is configured to provide for said at least one intermediate entity a translation key, said translation key being determined in dependence on the path data determined by said path generator in respect of said item identification means and being structured to enable translation by said intermediate entity of a digital signature associated with an upstream entity into a new digital signature associated with said intermediate entity and to enable said digital signature associated with said upstream entity to be replaced by said new digital signature associated with said intermediate entity the event that:

said intermediate entity receives an item identification means having stored therein said digital signature associated with said upstream entity;

said upstream entity and said intermediate entity are both entities on one said valid path; and said upstream entity is authorized to forward the item identification means to said intermediate entity on that valid path.

2. The control apparatus according to claim 1, wherein said path generator is configured to determine path data relating to different valid paths in respect of each of plurality of item identification means.

3. The control apparatus according to claim 1, further comprising a private key providing module configured to provide a private key for said at least one supplier entity to enable said supplier entity to store in said item identification means a digital signature associated with said supplier entity.

4. The control apparatus according to claim 1, further comprising a validation key provider responsive to said path generator and configured to provide for at least one intermediate or receiver entity at least one validation key, each said validation key enabling validation by said intermediate or receiver entity of a digital signature stored on an item identification means in the event that said digital signature is a digital signature associated with an upstream entity from which said item identification means may be received by said intermediate or receiver entity when traversing the network along a valid path.

5. The control apparatus according to claim 4, wherein said validation key provider is arranged to provide for at least one intermediate or receiver entity a plurality of different validation keys, each of said plurality of validation keys being associated with one or more item identifiers stored in one or more item identification means, respective validation keys enabling validation by said intermediate or receiver entity of a digital signature stored in an item identification means having an item identifier with which said validation key is associated.

6. The control apparatus according to claim 4, wherein said validation key provider is arranged to provide validation keys enabling validation using a radio-frequency reader device of digital signatures stored on item identification means.

7. The control apparatus according to claim 1, wherein said translation key provider is arranged to provide for at least one intermediate entity a plurality of different translation keys, each of said plurality of translation keys being associated with one or more item identifiers stored in one or more item identification means, respective translation keys enabling translation by said intermediate entity of a digital signature stored in an item identification means having an item identifier with which said translation key is associated.

8. The control apparatus according to claim 1, wherein said translation key provider is arranged to provide translation keys for enabling translation and re\-writing on item identification means of digital signatures using a radio-frequency writer device.

9. The control apparatus according to claim 1, wherein said control apparatus is for use in enabling verification of a radio-frequency item identifier such as an RFID tag.

10. A signing system for enabling verification of an item identification means traversing a path across a supply network, said signing system comprising a control apparatus according to claim 1 and at least one supplier entity signing module, said signing module being arranged to store in an item identification means a digital signature associated with said supplier entity.

11. The signing system according to claim 10, wherein said digital signature associated with said supplier entity is determined in dependence on a private signing key received from said control apparatus.

12. The signing system according to claim 10, wherein said signing module comprises a radio-frequency writer.

13. A system comprising a control apparatus and a re-signing system for enabling verification of an item identification means traversing a path across a supply network, said re-signing system comprising a data receiver in communication with the control apparatus and at least one intermediate entity re-signing module, said re-signing module being arranged to receive one or more translation keys from said control apparatus, said re-signing module comprising:

a translator configured to use a translation key to translate a digital signature associated with an upstream entity into a digital signature associated with said intermediate entity, wherein the control apparatus is the control apparatus according to claim 1.

14. The system according to claim 13, wherein said re-signing module is arranged to receive one or more validation keys from said control apparatus, said re-signing module further comprising a validation module for using a validation key to validate a digital signature stored on an item identification means.

15. The system according to claim 13, wherein said re-signing module comprises a radio-frequency reader and a radio-frequency writer.

16. A system comprising a control apparatus and a verification system for verification of an item identification means traversing a path across a supply network, said verification system comprising a data receiver in communication with the control apparatus and at least one receiver entity verification module, said verification module being arranged to receive one or more validation keys from said control apparatus, said verification module comprising a validation module for using a validation key to validate a digital signature stored on an item identification means, wherein the control apparatus is the control apparatus according to claim 1.

17. The system according to claim 16, wherein said verification module comprises a radio-frequency reader.

18. A control method for enabling verification by entities on a path across a supply network of an item identification means traversing said path, the network comprising: at least one supplier entity operable to introduce into the network an item identification means having stored therein an item identifier and a digital signature associated with said supplier entity, and to forward said item identification means along a path across said network; at least one intermediate entity operable to receive said item identification means from said at least one supplier entity or from another intermediate entity in said network and forward said item identification means along said path; and at least one receiver entity operable to receive said item identification means from an intermediate entity in said network; the control method comprising:

- determining path data in respect of an item identification means, said path data relating to at least one path across the network deemed to be a valid path, each said valid path being a path by which said item identification means is permitted to traverse the network from a supplier entity to a receiver entity via one or more intermediate entities each of which is deemed to be authorized to forward the item identification means to or receive the item identification means from another entity on said valid path, said path data comprising:
- data in respect of said at least one intermediate entity indicative of one or more entities upstream thereof from which said item identification means is permitted to be received when traversing the network along one said valid path; and
- data in respect of said at least one receiver entity indicative of one or more entities upstream thereof from which said item identification means is permitted to be received when traversing the network along one said valid path;
- providing for said at least one intermediate entity a translation key determined in dependence on said path data, said translation key being determined in dependence on the path data determined in respect of said item identification means and being structured to enable translation by said intermediate entity of a digital signature associated with an upstream entity into a new digital signature associated with said intermediate entity and to enable said digital signature associated with said upstream entity to be replaced by said new digital signature associated with said intermediate entity the event that:
- said intermediate entity receives an item identification means having stored therein said digital signature associated with said upstream entity;
- said upstream entity and said intermediate entity are both entities on one said valid path; and
- said upstream entity is authorized to forward the item identification means to said intermediate entity on that valid path.

19. The control method according to claim 18, further comprising providing for at least one intermediate or receiver entity at least one validation key determined in dependence on said path data, each said validation key enabling validation by said intermediate or receiver entity of a digital signature stored on an item identification means in the event that said digital signature is a digital signature associated with an upstream entity from which said item identification means may be received by said intermediate or receiver entity when traversing the network along a valid path.

20. A signing method for enabling verification of an item identification means traversing a path across a supply network, said signing method comprising performing the control method of claim 18, and further comprising at least one supplier entity storing a digital signature associated with said supplier entity in an item identification means.

21. A re-signing method for enabling verification of an item identification means traversing a path across a supply network, said re-signing method comprising:

- communicating with a control apparatus to receive at least one translation key from said control apparatus; and
- using said translation key to translate a digital signature associated with an upstream entity into a digital signature associated with said intermediate entity, wherein the control apparatus is configured to perform the control method of claim 18.

22. The re-signing method according to claim 21, further comprising receiving at least one validation key from said control apparatus and using said validation key to validate a digital signature stored on an item identification means.

23. A verification method for verification of an item identification means traversing a path across a supply network, said verification method comprising:

- communicating with a control apparatus to receive at least one validation key from said control apparatus; and
- using said validation key to validate a digital signature stored on an item identification means,
    wherein the control apparatus is configured to perform the control method of claim 18.

* * * * *

UNITED STATES PATENT AND TRADEMARK OFFICE
CERTIFICATE OF CORRECTION

PATENT NO. : 8,660,914 B2  Page 1 of 1
APPLICATION NO. : 13/063074
DATED : February 25, 2014
INVENTOR(S) : Soppera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 156 days.

Signed and Sealed this

Twenty-ninth Day of September, 2015

Michelle K. Lee
*Director of the United States Patent and Trademark Office*